I. C. WOODWARD.
DIFFERENTIAL GEAR CONTROL MECHANISM.
APPLICATION FILED JAN. 20, 1920.
1,355,297.
Patented Oct. 12, 1920.
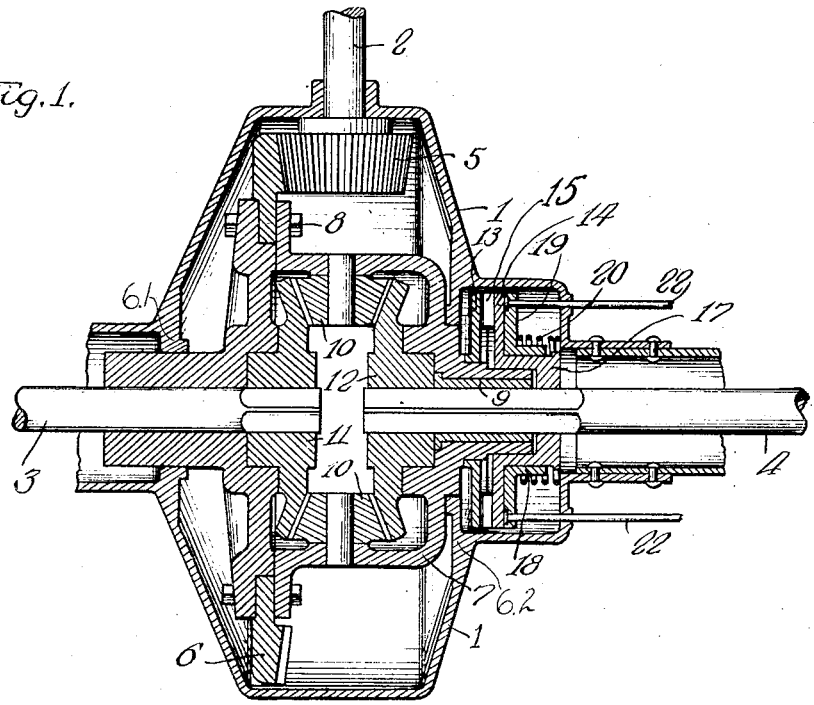
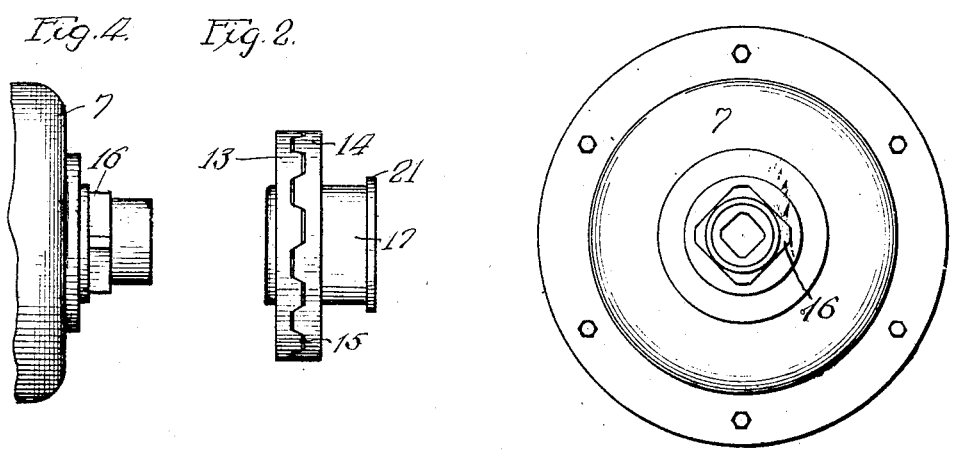

UNITED STATES PATENT OFFICE.

IRVING C. WOODWARD, OF CHICAGO, ILLINOIS.

DIFFERENTIAL-GEAR-CONTROL MECHANISM.

1,355,297.

Specification of Letters Patent.  Patented Oct. 12, 1920.

Application filed January 20, 1920. Serial No. 352,826.

*To all whom it may concern:*

Be it known that I, IRVING C. WOODWARD, a citizen of the United States of America, and a resident of Chicago, county of Cook, and State of Illinois, have invented certain new and useful Improvements in Differential-Gear-Control Mechanism, of which the following is a specification.

This invention relates to differential gears and particularly to devices for controlling or limiting differential action in such mechanisms at times when it is desirable to resist differential action.

It is well known that the usual differential gears under certain conditions give rise to serious troubles such as skidding, racing of the engine, loss of traction, etc., and numerous attempts have been made to cure these troubles by modifying the construction of differential gearing and interposing resistance to the normal differential action. Among these expedients has been the use of a friction clutch between the opposed ends of the driven shafts of a motor vehicle. The objection to such a construction is that it is always active and that it, therefore, does not permit of the free differential action which is required to prevent undue wear upon the tires of the vehicle in passing along a curved path where the speed of one of the driven wheels is greater than that of the other.

The main object of the present invention is to provide an improved form of differential gear control mechanism which may be thrown in or out of action at the will of the operator according to circumstances, and which will permit unrestrained differential action under normal conditions, and permit of restraining the differential action so as to insure that a predetermined amount of tractive power may be delivered to each driven wheel regardless of the condition of the roadway or the fluctuation of tractive load on the wheels.

An illustrative embodiment of this invention is shown in the accompanying drawings, in which—

Figure 1 is a sectional plan view of a differential gearing constructed according to this invention.

Fig. 2 is a side elevation of the clutch mechanism.

Fig. 3 is an end view of the housing which carries the planetary gearing.

Fig. 4 is an elevation of the clutch end of the differential casing.

In the form shown in the drawings, the differential gearing comprises the usual frame structure or housing 1, power shaft 2 and driven shafts 3 and 4. The beveled pinion 5 meshes with a gear 6 loosely journaled concentric with the shaft 3 in a bearing 6.1. A spider or housing 7 for the planetary gears is secured to the gear 6 by bolts 8, and is in turn journaled in a bearing 6.2. The housing 7 carries a bushing 9 which has a square axial opening through which the squared end of the shaft 4 extends. A plurality of planetary gears 10 are journaled on stud shafts carried by the housing 7 and mesh with the beveled gears 11 and 12 on the squared ends of the shafts 3 and 4 in the usual manner.

The present invention resides in the means for controlling the action of differential gearing and, in the particular form illustrated, comprises a clutch interposed between the planetary gear housing 7 and the shaft 4, it being understood that the locking of the shaft 4 to the housing 7 has the effect of locking the entire differential gearing thereby compelling both shafts 3 and 4 to rotate as a unit.

The clutch mechanism comprises a pair of clutch elements 13 and 14 having interfitting projections or shoulders 15 on their opposed faces, and the abutting side faces of the shoulders 15 are inclined as shown in Fig. 2. The element 13 is provided with a square central opening fitting a squared portion of the periphery of the hub 16 of the housing 7 whereby the element 13 is fast on said housing. The clutch element 14 has a hub 17 provided with a squared aperture slidably fitting the squared end of the shaft 4 and has a circular counter bore in line with said squared opening, engaging and being supported upon the cylindrical end of the hub 16.

A sleeve 18 is seated in an annular peripheral groove on the hub 17 and has an annular flange 19. A helical spring 20 bears between the flange 19 and an adjacent abutment provided by the housing 1 and when released holds the clutch elements in interlocking relation with the clutch element 13. A pair of rods 22, connected to the flange 19, provide means for shifting the sleeve 18 against the action of the spring 20, and through the engagement of said sleeve with a collar or shoulder 21 on the hub 17 shifts the clutch element 14 out of driving contact with the element 13.

When the clutch elements 13 and 14 are engaged, the shaft 4 is locked to the housing 7 whereby both of the driven shafts will be rotated in unison. The abutting faces of the shoulders 15 of the clutch elements are disposed at such an angle that when a certain predetermined tortional strain is exceeded the clutch elements will be wedged apart and differential rotation of the driven shafts may take place.

The rods 22 may be actuated and locked so as to hold the clutch open by any of the usual forms of lever and toggle mechanism such as are used on the brakes of automobiles.

The operation of the device shown is as follows:

When the clutch is open, the power is transmitted as usual so that the driven shafts will each receive an equal amount of power when the tractive resistance of the vehicle wheels is equal. When the vehicle is driven in a curve, the wheel traversing the path of lesser radius slows down accordingly, while the wheel traversing the path of greater radius increases its speed as usual.

When, however, the pavement is slippery or the vehicle is on a steep grade or when the road is rough so that the vehicle wheels are sometimes lifted clear of the road, the operator may prevent skidding, racing of the engine, loss of traction, and other troubles inherent in the usual differential gearing, by throwing in the gear locking clutch and thereby preventing free differential action. If then, due to road conditions or the manner of operating the vehicle, one of the driven wheels loses its tractional hold on the road, the clutch will insure an amount of power, up to the limit of the holding power of the clutch, to be positively delivered to both driven shafts, but if the circumstances are such that the strain on the clutch is sufficient to overcome the holding power of the inclined clutchy shoulder faces and spring, then the clutch elements will be forced apart against the spring and differential action will take place thus preventing excessive strain upon the gearing.

Although but one specific embodiment of this invention has been herein shown and described, it will be understood that numerous details of the construction shown may be altered or omitted without departing from the spirit of this invention as defined by the following claims.

I claim:

1. A differential gear mechanism, comprising a driving member and a pair of driven members, a clutch interposed between two of said members, said clutch comprising a pair of elements having coacting shoulders on their opposed faces, and yielding means for normally holding said elements in driving relation to each other, said shoulders being inclined and adapted to open said clutch when the load thereon exceeds a predetermined amount.

2. A differential gear mechanism, comprising a driving member and a pair of driven members, a clutch interposed between two of said members, said clutch comprising a pair of elements having coacting shoulders on their opposed faces, and a spring normally urging one of said clutch elements toward the other, said shoulders being inclined and adapted to open said clutch when the load thereon exceeds a predetermined amount.

3. A differential gear mechanism, comprising a driving member and a pair of driven members, a clutch interposed between two of said members, said clutch comprising a pair of elements having coacting shoulders on their opposed faces, yielding means for normally holding said elements in driving relation to each other, said shoulders being inclined and adapted to open said clutch when the load thereon exceeds a predetermined amount, and other means for holding said clutch elements in non-driving relation.

4. A device of the class described, comprising a pair of driven shafts, differential gearing connecting said shafts and comprising a driving member and a pair of driven members, the latter being respectively connected in driving relation to said shafts, a clutch having one element splined to one of said shafts and another fixed with respect to one of said members that is not connected to said shaft, and yielding means normally urging said clutch elements into engagement with each other to lock said shafts against differential operation, said clutch elements having inclined abutting surfaces adapted to open said clutch against the action of said yielding means when the difference between the tortional loads encountered by said shafts exceeds a predetermined amount.

Signed at Chicago this 30 day of Dec. 1919.

IRVING C. WOODWARD.